United States Patent
Foreman

(10) Patent No.: US 12,131,197 B2
(45) Date of Patent: Oct. 29, 2024

(54) CONTAINER LOAD BALANCING AND AVAILABILITY

(71) Applicant: KYNDRYL, INC., New York, NY (US)

(72) Inventor: Park Foreman, Austin, TX (US)

(73) Assignee: KYNDRYL, INC., New York, NY (US)

( * ) Notice: Subject to any disclaimer, the term of this patent is extended or adjusted under 35 U.S.C. 154(b) by 432 days.

(21) Appl. No.: 16/694,199

(22) Filed: Nov. 25, 2019

(65) Prior Publication Data
US 2021/0157655 A1    May 27, 2021

(51) Int. Cl.
G06F 9/50    (2006.01)

(52) U.S. Cl.
CPC ................... G06F 9/5083 (2013.01)

(58) Field of Classification Search
CPC .................................................. G06F 9/5083
See application file for complete search history.

(56) References Cited

U.S. PATENT DOCUMENTS

| | | | |
|---|---|---|---|
| 7,757,236 B1 | 7/2010 | Singh | |
| 8,713,566 B2 | 4/2014 | Kashyap et al. | |
| 9,462,427 B2 | 10/2016 | Patel et al. | |
| 10,250,677 B1 | 4/2019 | Aizikovich | |
| 2003/0067923 A1* | 4/2003 | Ju | H04L 61/1511 370/395.3 |
| 2007/0214269 A1* | 9/2007 | Davidsson | H04W 76/25 709/227 |
| 2010/0313150 A1* | 12/2010 | Morris | G06F 9/452 715/761 |
| 2014/0325510 A1* | 10/2014 | Bolte | G06F 9/45533 718/1 |

(Continued)

FOREIGN PATENT DOCUMENTS

| | | | |
|---|---|---|---|
| CN | 102882973 | * | 5/2015 |
| EP | 2254310 | | 11/2010 |

OTHER PUBLICATIONS

Rodero-Merino, Luis, et al. "From infrastructure delivery to service management in clouds." Future Generation Computer Systems 26.8, pp. 1226-1240. (Year: 2010).*

(Continued)

*Primary Examiner* — Meng Ai T An
*Assistant Examiner* — Willy W Huaracha
(74) *Attorney, Agent, or Firm* — Dan Housley; Rupam Bhar; Calderon Safran & Wright P.C.

(57) ABSTRACT

A system includes a container cluster including plural hosts that communicate with one another via a network. Each of the plural hosts includes a computing node that includes an operating system and a container runtime configured to run containers. Each of the plural hosts stores a respective member list that defines capabilities of the plural hosts in the container cluster. Each of the plural hosts is configured to identify another one of the plural hosts for running a container based on comparing tags of the container to the capabilities of the plural hosts defined in the respective member list. Each respective one of the plural hosts is configured to perform the identifying the another one of the plural hosts for running the container in response to determining the respective one of the plural hosts is resource-constrained from running the container.

15 Claims, 8 Drawing Sheets

(56) References Cited

U.S. PATENT DOCUMENTS

| | | | |
|---|---|---|---|
| 2015/0355924 A1* | 12/2015 | Holla | G06F 9/45558 |
| | | | 718/1 |
| 2016/0094483 A1* | 3/2016 | Johnston | H04L 47/827 |
| | | | 709/226 |
| 2016/0182378 A1 | 6/2016 | Basavaraja et al. | |
| 2017/0063722 A1* | 3/2017 | Cropper | G06F 9/5061 |
| 2017/0126506 A1* | 5/2017 | Padala | H04L 43/08 |
| 2017/0199770 A1* | 7/2017 | Peteva | G06F 9/5088 |
| 2018/0075152 A1* | 3/2018 | Zhang | G06F 9/455 |
| 2018/0270125 A1 | 9/2018 | Jain et al. | |
| 2018/0329757 A1 | 11/2018 | Patgar et al. | |
| 2018/0357044 A1* | 12/2018 | Hollands | G06F 8/61 |
| 2019/0052532 A1 | 2/2019 | Chen et al. | |
| 2019/0102206 A1 | 4/2019 | Fichtenholtz et al. | |
| 2019/0102226 A1* | 4/2019 | Caldato | G06F 8/60 |
| 2019/0250946 A1* | 8/2019 | Parameshwaran | G06F 9/5088 |
| 2020/0042340 A1* | 2/2020 | Wiggers | G06F 9/5077 |
| 2021/0042151 A1* | 2/2021 | Müller | G06F 9/5083 |
| 2021/0073047 A1* | 3/2021 | Bhandaru | H04L 41/0893 |
| 2021/0271499 A1* | 9/2021 | Fong | G06F 9/45558 |

OTHER PUBLICATIONS

Priebe, Christian, et al. "Cloudsafetynet: Detecting data leakage between cloud tenants." Proceedings of the 6th edition of the ACM Workshop on Cloud Computing Security, pp. 117-128 (Year: 2014).*

CN Patent 102882973A EPO English Translation (Year: 2017).*

Anonymous, "Load Balancing Microservices-Based Applications", White Paper, AVI Networks, www.AVINETWORKS.com, accessed, Jun. 28, 2019, 8 pages.

Brown, "Effectively Managing Kubernetes Resources with Cost Monitoring", https://medium.com/kubecost/effectively-managing-kubernetes-with-cost-monitoring-96b54464e419, kubecost, Oct. 29, 2018, 9 pages.

Mell et al., "The NIST Definition of Cloud Computing", NIST, Special Publication 800-145, Sep. 2011, 7 pages.

\* cited by examiner

CONTAINER LOAD BALANCING AND AVAILABILITY

BACKGROUND

Aspects of the present invention relate generally to computer container technology and, more particularly, to container load balancing and availability.

A container is a stand-alone executable package of a piece of software that includes everything needed to run it, including application code, runtime, system tools, system libraries, and settings. Containers are lightweight and constructed from layered filesystems, e.g., sharing common files, making disk usage and image downloads efficient. A container can run in various environments including but not limited to a local computing device (e.g., a desktop or a laptop), physical or virtual machines in a data center, and cloud providers.

Containers provide lightweight virtualization that allows for isolating processes and/or resources without the need of providing instruction interpretation mechanisms and/or other complexities of full virtualization. Container technology, such as Linux Container (LXC), provides lightweight virtualization that allows isolating processes and resources without the need to provide instruction interpretation mechanisms and other complexities of full virtualization. Containers effectively partition the resources managed by a single host operating system (OS) into isolated groups to better balance the conflicting demands on resource usage between the isolated groups. That is, the container technology allows sharing a common OS and possibly some appropriate binary files or libraries. As such, plural containers can run simultaneously on a same computer device, each sharing the same OS kernel of the computer device and each running as an isolated process in user space.

Containers differ from virtual machines (VMs) in the sense that VMs are an abstraction of physical hardware effectively turning one server into plural servers, with a hypervisor controlling the plural VMs running on a single machine. Each VM includes a full copy of an OS, one or more applications, and any necessary binaries and libraries. Containers typically take up less storage space than VMs and start (e.g., boot) faster than VMs.

SUMMARY

In a first aspect of the invention, there is a computer-implemented method including: determining, by a first host in a container cluster, the first host is resource-constrained from running a container; identifying, by the first host, a second host in the container cluster with capabilities matching the container; transmitting, by the first host, a request to the second host to run the container; receiving, by the first host, an acceptance from the second host; and moving, by the first host, the container to the second host.

In another aspect of the invention, there is a computer program product including a computer readable storage medium having program instructions embodied therewith. The program instructions are executable by a second host in a container cluster to cause the second host to: receive a request from a first host in the container cluster to run a container that the first host is resource-constrained from running; determine the second host is not resource-constrained from running the container; transmit an acceptance to the first host; copy the container onto the second host; and run the container on the second host.

In another aspect of the invention, there is system including a container cluster comprising plural hosts that communicate with one another via a network. Each of the plural hosts comprises a computing node that includes an operating system and a container runtime configured to run containers. Each of the plural hosts stores a respective member list that defines capabilities of the plural hosts in the container cluster. Each of the plural hosts is configured to identify another one of the plural hosts for running a container based on comparing tags of the container to the capabilities of the plural hosts defined in the respective member list.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
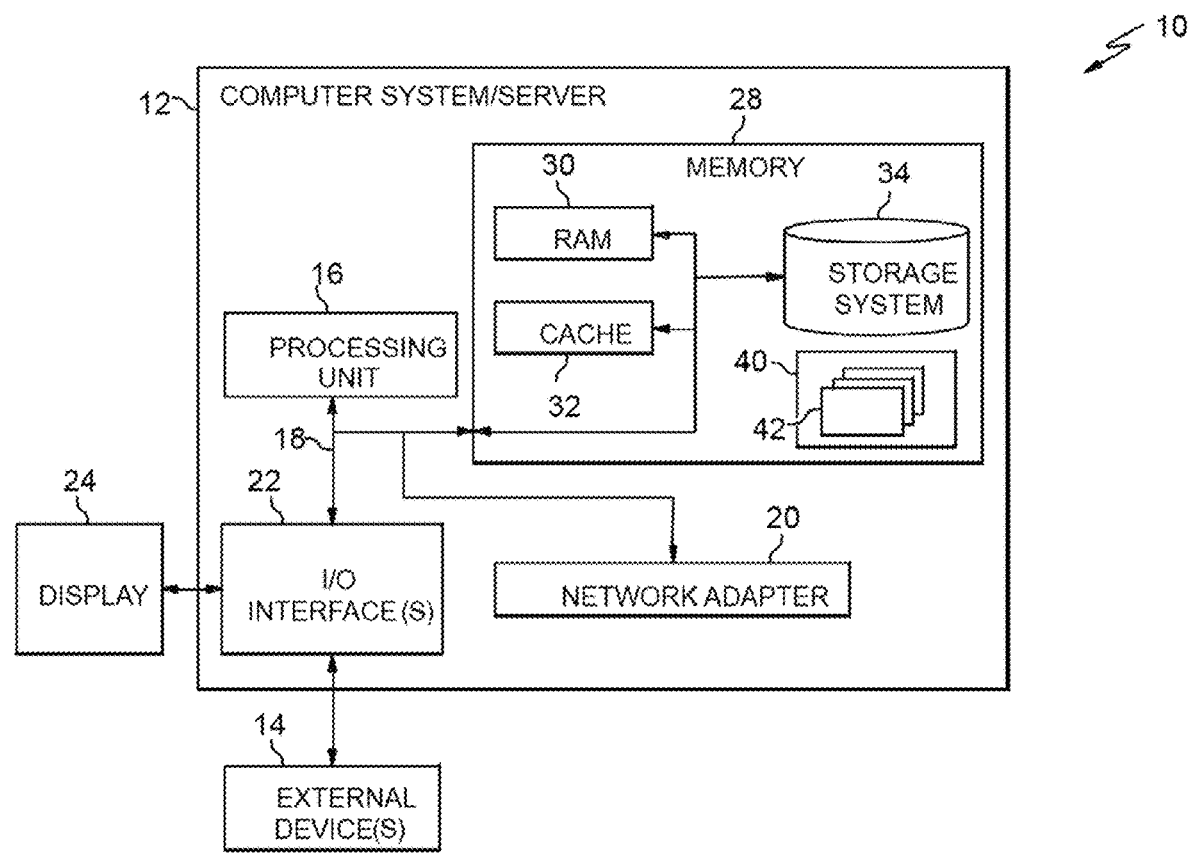
FIG. 1 depicts a cloud computing node according to an embodiment of the present invention.

Aspects of the present invention relate generally to computer container technology and, more particularly, to container load balancing and availability. According to aspects of the invention there is a system comprising a container cluster comprising plural hosts that communicate with one another via a network and wherein: each of the plural hosts comprises a computing node that includes an operating system and a container runtime configured to run containers; each of the plural hosts stores a respective member list that defines capabilities of the plural hosts in the container cluster; and each of the plural hosts is configured to identify another one of the plural hosts for running a container based on comparing tags of the container to the capabilities of the plural hosts defined in the respective member list. In embodiments, each respective one of the plural hosts is configured to perform the identifying the another one of the plural hosts for running the container in response to determining the respective one of the plural hosts is resource-constrained from running the container. In this manner, implementations of the invention perform load balancing within a container cluster at a peer-to-peer level, with the individual nodes of the cluster performing actions in the load balancing determination and moving containers within the cluster.

Computer container technology allows for multiple microservices to run on a single host. In some cases, a particular host may have resources available only to it and must prioritize the containers that it will support. The demand for those resources will vary and still containerization will allow for lower-priority containers to execute.

When higher priority services override the needs of running containers on a host, a mechanism to move the lower priority containers to another host is desired to free up resources (e.g., memory, CPU, disk, network, etc.). In most cases, load-balancing requires some specialized system to coordinate the process. This is particularly relevant when multiple parties have invested in computing resources and have spare capacity. This allows one or more parties, e.g., party A, to participate dynamically in forming or contributing to a cluster of processing facilities. According to rules stipulated by party A, spare processing power can be offered to other parties. Conversely, the other members can offer spare resources during a peak demand period for party A. This creates a community of resource contributors and automatically optimizes utilization based on community priorities.

Implementations of the invention enable a multiple-host container cluster to function as a self-defining, sharing, adaptive cluster. Embodiments avoid the use of a central administration a single policy for container load balancing in the cluster. Instead, load balancing is performed by any node that has an authenticated, secure membership in the cluster. This advantageously allows for: faster addition or removal from the cluster without a central usage policy; multiple, independent department or host-level ownership and control of specific cluster members; sharing resources among member-owners of the cluster hosts; optimizing excess resources available among all of the participating organization's assets, thereby reducing costs; and permitting each member of the cluster to prioritize usage for assets it owns and also reduce wasted provisioning.

Embodiments of the invention provide a process and protocol to enable tag-based optimal movement of containers among participants in a cluster of hosts without central, technical orchestration or control. Implementations may include systems having container clusters of two or more hosts with any number of microservices running on them. In embodiments, each host group member maintains a definition of capabilities, priorities, and privileges of all other cluster members, which may include for example and without limitation: which other host group members are permitted to participate in the cluster; a last advertised location (IP address or Fully Qualified Domain Name) of the members; a tag for every container running on the current host group member; and priorities of capabilities which the current host group member will support (e.g., referred to a distinct service). Examples of distinct services include but are not limited to: those containers requiring 2 or more CPUs; access to a specific type of storage; access to another microservice running on the same container cluster; and other specified application-layer capability. In embodiments, each of the cluster members communicates status and local resource availability to other members. Through a system of matching and prioritizing, each host load balances the workloads in coordination with the other hosts in the cluster.

Docker is an open-source project that automates the deployment of applications inside software containers by providing an additional layer of abstraction and automation of operating-system-level virtualization on Linux. Docker uses resource isolation features of the Linux kernel such as cgroups and kernel namespaces to allow independent "containers" to run within a single Linux instance, avoiding the overhead of starting and maintaining virtual machines. Kubernetes is an open source container orchestration system for automating deployment, scaling, and management of containerized applications across clusters of hosts. Kubernetes supports a range of container tools, including Docker. Kubernetes deploys containers (i.e., workloads) to a plurality of nodes (e.g., a physical machine or virtual machine). Each node contains the services necessary for running containers in the cluster, including at least a container runtime, which is the software that is responsible for running containers. The term(s) "Docker" and "Linux" and "Kubernetes" may be subject to trademark rights in various jurisdictions throughout the world and are used here only in reference to the products or services properly denominated by the marks to the extent that such trademark rights may exist. As used herein, the terms "cluster" and "container cluster" are used interchangeably and refer to a group of one or more nodes that are configured to run containers in accordance with a container orchestration system, such as Kubernetes, for example.

In some container cluster architectures, each cluster includes a master node that automatically schedules pods across nodes in the cluster. A pod is a Kubernetes abstraction that represents a group of one or more containers (such as Docker), and some shared resources for those containers. The master node takes into account the available resources on each node when performing this automatic scheduling. In contrast to container cluster architectures that employ this type of centralized load balancing, e.g., by a master node, implementations of the invention perform load balancing within a container cluster at a peer-to-peer level, with the individual nodes of the cluster performing actions in the load balancing determination and moving containers within the cluster. Embodiments enable multiple host container clusters (e.g., Kubernetes clusters) to function as a self-defining, sharing, adaptive cluster. Embodiments do not require central administration (e.g., a master node) or a single policy for load balancing within the cluster.

Aspects of the invention provide a protocol, and methods and systems that utilize the protocol, for allowing a group of host container clusters (e.g., Kubernetes clusters) to operate as a decentralized, adaptive cluster, the protocol comprising: a self-defined participation feature that allows for host container clusters to join or leave the group by using a credential to send a join or leave message to another host container cluster of the group, where the other host container cluster of the group advertises the join or leave to the remaining members of the group; a requirements tagging feature that allows for host container clusters of the group to tag themselves with their respective container hosting requirements, the container hosting requirements including available computing resources and/or available container functions; and a load balancing feature that allows for host container clusters of the group to identify containers for relocation, match the identified containers to other host container clusters of the group based on their respective tags, and, in response to receiving acceptance messages from the matched other host container clusters, transfer the identified containers to the matched other host container clusters.

Implementations of the invention improve the functioning of a distributed computer system (e.g., a container cluster) by providing improved load balancing within the system. The improved load balancing improves the functioning of the system by minimizing wasted resources within the system, which results in tasks being performed faster and/or more efficiently within the system. Aspects of the invention are also directed to concepts that are inherently rooted in computer technology, such as container clusters and running containers.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
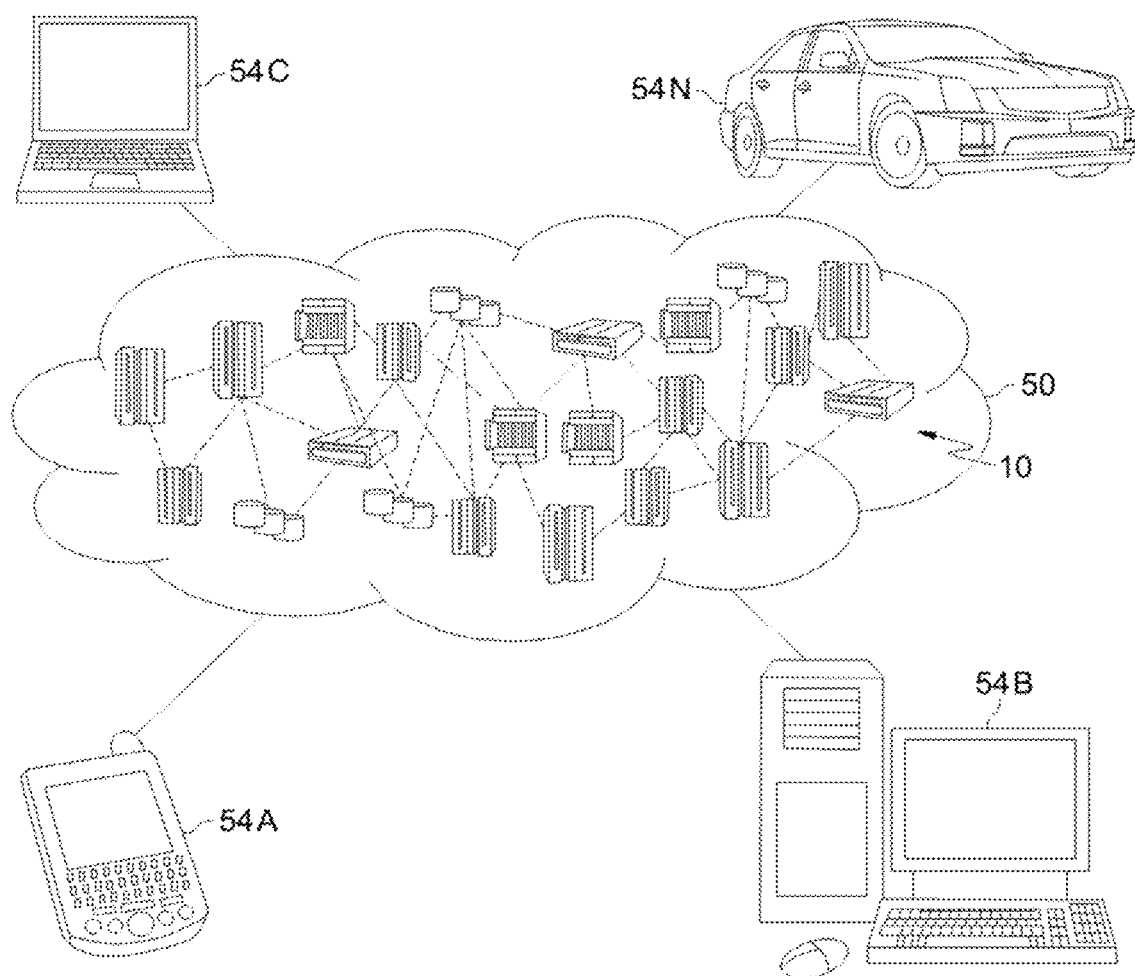
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
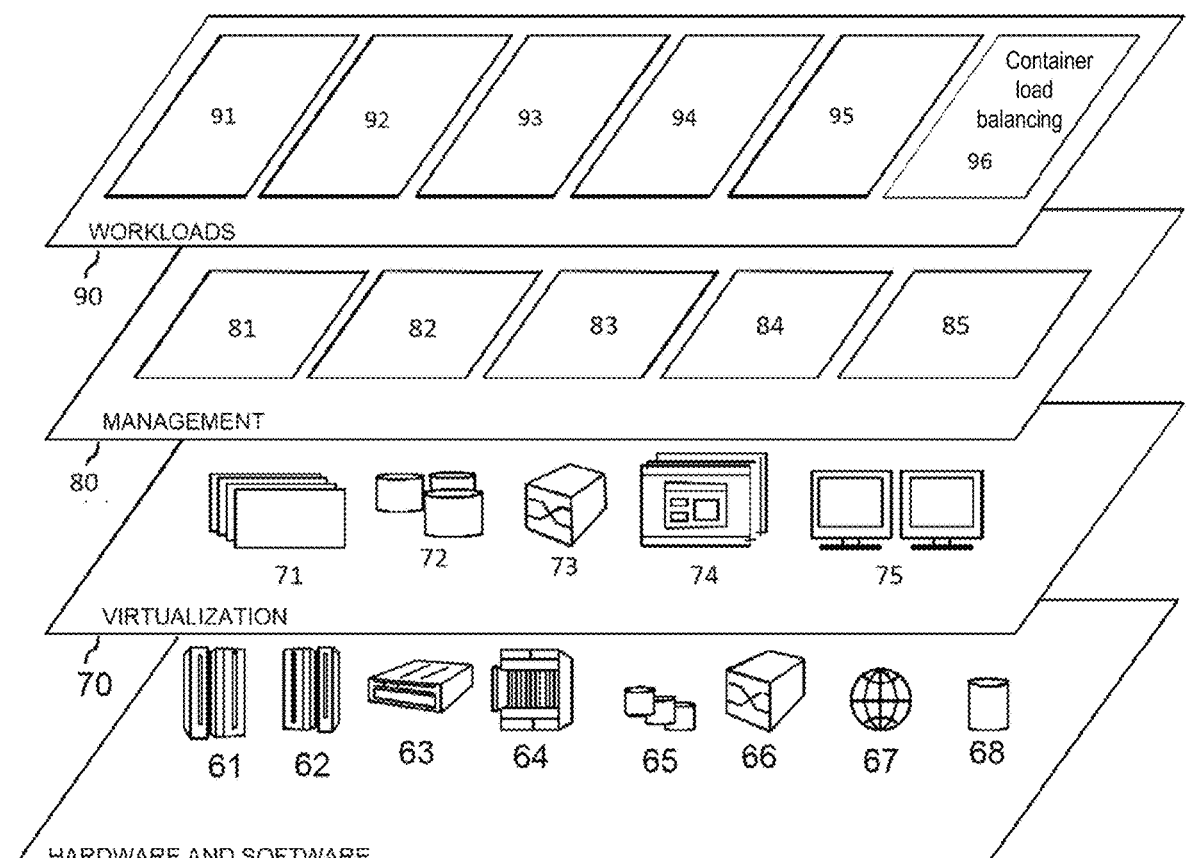
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container load balancing 96.

Implementations of the invention may include a computer system/server 12 of FIG. 1 in which one or more of the program modules 42 are configured to perform (or cause the computer system/server 12 to perform) one of more functions of the container load balancing 96 of FIG. 3. For example, the one or more of the program modules 42 may be configured to: determine a first host in a container cluster is resource-constrained from running a container; identifying a second host in the container cluster with capabilities matching the container; and move the container to the second host so that the second host runs the container.

Figure 4:
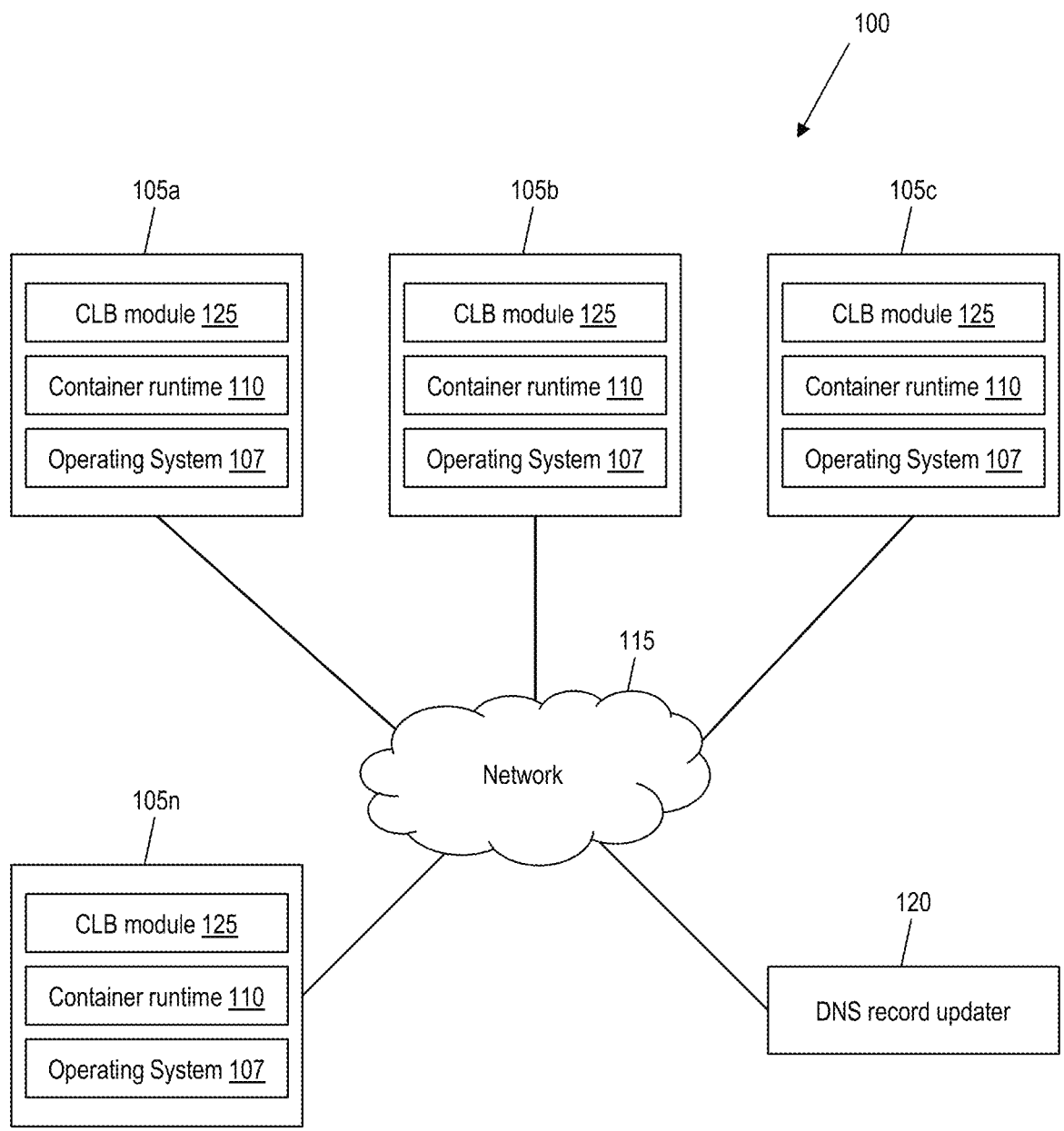
FIG. 4 shows a block diagram of an exemplary environment in accordance with aspects of the invention.

FIG. 4 shows a block diagram of an exemplary environment in accordance with aspects of the invention. In embodiments, the environment includes a container cluster 100 comprising a plurality of nodes 105a, 105b, 105c, . . . , 105n. In embodiments, each of the nodes 105a-n comprises a computer device (e.g., such as computer system/server 12) or a virtual machine (VM), and has an operating system 107 and a container runtime 110 that are configured to run containers. In one example, the cluster 100 is a Kubernetes cluster and each of the nodes 105a-n is a Docker instance, although implementations of the invention are not limited to use with Kubernetes and Docker, and other container systems may be used. Nodes are also referred to herein as "hosts."

As shown in FIG. 4, the nodes 105a-n are operatively connected to one another and communicate with one another over a network 115, which may comprise one or more computer networks including one or more of a LAW, WAN, and the Internet. In an exemplary cloud implementation, the network 115 comprises or is part of a cloud computing environment 50 as shown in FIG. 3, and each of the nodes 105a-n comprises a cloud computing node 10 in the cloud computing environment 50.

Although only a single cluster 100 is shown, each of the individual nodes 105a-n may be a member of more than one cluster at any given time. For example, node 105a may be a member of the cluster 100 at the same time as being a member of another cluster (not shown). Moreover, each of the nodes 105a-n is capable of running more than one container at any given time. In embodiments, the number of nodes 105a-n in the cluster 100 is two or more.

Still referring to FIG. 4, the cluster 100 may optionally include a Domain Name System (DNS) record updater 120 that is configured to maintain and update a record of locations of containers within the cluster 100. As described herein, the DNS record updater 120 is not a central load balancer, e.g., like a master node in a Kubernetes cluster, at least for the reason that it does not schedule or assign containers to nodes 105a-n in the cluster 100.

In accordance with aspects of the invention, each of the nodes 105a-n includes and runs a container load balancing (CLB) module 125 that is configured to perform one or more of the processes described herein, such as load balancing in the cluster. The CLB module 125 may comprise one or more program modules 42 of FIG. 1. The CLB module 125 may be included in the container runtime 110 or may be a separate program module from the container runtime 110.

According to aspects of the invention, containers that are run in the cluster 100 are optionally tagged with one or more descriptors defined as tags. These tags may contain any number of "name:value" pairs (e.g., json pairs) suitable for defining the host requirements of a given container. The name value pairs can be provided as a list of requirements with any combination of logical operators and nested groups with parenthetical identifiers. Examples of host requirements include computing resources such as CPU, memory, disk, and network bandwidth. Host requirements may also indicate access to a particular other container by name or function.

In one example, a container tagged with the tag "CPU:*2" indicates that at least 2 CPU cores are required on a host for running this container. In another example, a container tagged with the tag "CONTAINER:AuthUser" indicates a requirement that the host running the container also have a particular container with a user authentication function available. In another example, a container tagged with the tag "Application:MyApp" indicates that the container supports a particular application that must be present on or accessible by the host running the container. In another example, a container tagged with the tag "Network: 192.168.1.0/24:1234" indicates that a host running the container must have access to the specified network over port 1234. Aspects of the invention are not limited to these examples of host requirements for the tags, and other types of host requirements may be used in implementations.

Continuing this example, if the above tags are combined for a specific container, then in embodiments only hosts having capabilities matching these tags are considered for running this container. In one embodiment, all the tags are mandatory requirements. In another embodiment, the tags may be combined with logical operators to define mandatory requirements and preferred but not mandatory requirements. For example, by adding an asterisk "*" in front of the tag value, it is also possible to differentiate "requirements" from "preferred" capabilities. In this example, the receiving host must be able to supply 2 CPU cores due to the asterisk "*" in the tag "CPU:*2". Also in this example, it is preferred but not necessary for the host running the container to have a container for user authentication and the "MyApp" application.

In embodiments, it is not necessary for each container to be tagged with each type of available tag. For instance, one container might be tagged with only CPU tag, and another container might be tagged with a CPU tag, a network tag, and an application tag. Each container may be tagged with any desired combination of tags, or even no tags at all. In this manner, each container may optionally be provided with a set of host requirements (defined by the tags of that container) that are tailored to that container.

According to further aspects of the invention, each of the nodes 105a-n is characterized by a set of capabilities of that node. In embodiments, the node capabilities are selected from a group corresponding to a same set of host requirements from which the container tags are selected. For example, when the container tags are selected from the group consisting of CPU, memory, disk, and network bandwidth, each of the nodes 105a-n is characterized by its respective CPU capability, memory capability, disk capability, and network bandwidth capability. In embodiments, each node 105a-n stores data defining these capabilities.

In accordance with aspects of the invention, the individual nodes 105a-n of the cluster perform load balancing of running containers in the cluster based on the tags of the containers and the capabilities of the nodes. In embodiments, when a particular node (e.g., node 105a) hosting a container determines that it is resource-constrained from running the container, the node identifies another node (e.g., node 105b) in the cluster 100 to run the container, the identifying being performed by comparing the tags of the container to the capabilities of the other nodes (e.g., nodes 105b-n) in the cluster 100. In embodiments, the CLB module 125 is programmed with logic to: determine when a node is resource-constrained from running the container; and based on this determination, to identify another node in the cluster to run the container based on the tags of the container to the capabilities of the other nodes in the cluster.

Figure 5:
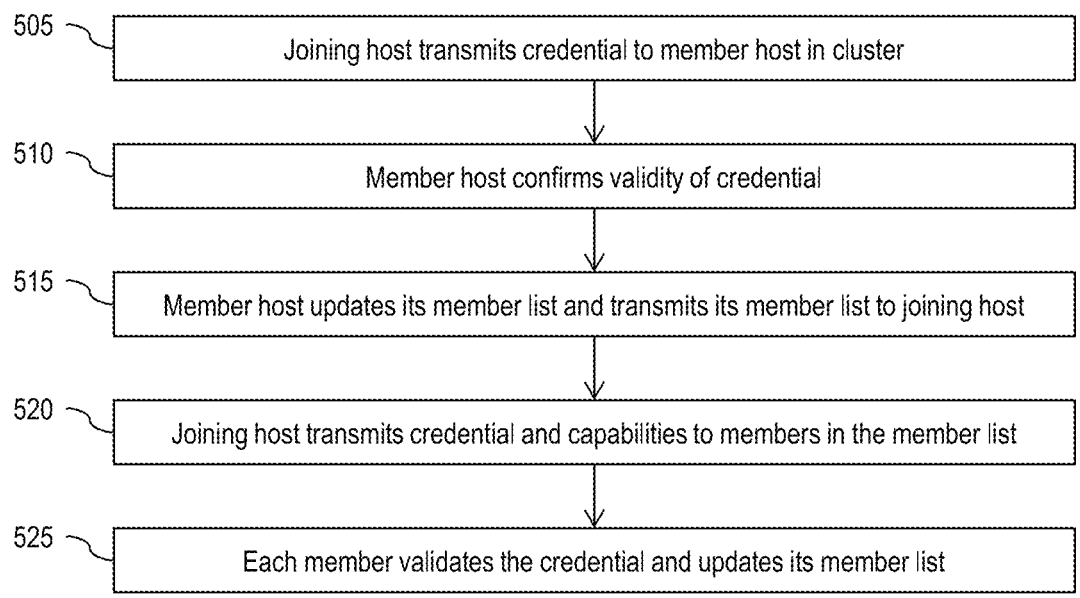
FIG. 5 shows a flowchart of an exemplary method in accordance with aspects of the invention.

FIG. 5 shows a flowchart of an exemplary method of joining a cluster in accordance with aspects of the present invention. Steps of the method may be carried out in the environment of FIG. 4 and are described with reference to elements depicted in FIG. 4.

At step 505, a joining host initiates a "join" action by transmitting a credential to a member host in a cluster. In an illustrative example, nodes 105a, 105b, 105c are members of a cluster 100, and node 105n wishes to join the cluster 100. In this example, step 505 comprises the CLB module 125 of node 105n transmitting a credential to one of the existing members of the cluster, e.g., to node 105a, via the network 115. In embodiments, the credential is any conventional or later-developed credential configured for authenticating hosts in a distributed computing environment, and may comprise any suitable standard for cryptography over a network. In embodiments, step 505 also includes the joining host transmitting other information to the member host, such as an IP address of the joining host and capabilities of the joining host.

At step 510, the member host confirms the validity of the credential. In this example, the CLB module 125 of node 105a confirms the validity of the credential that was submitted by node 105n in step 505. If the credential is not valid, then the joining member is not permitted to join the cluster.

If the credential is deemed valid at step 510, then at step 515 the member host updates its member list to include information about the joining host. In embodiments, and as described with respect to FIG. 4, each member of the cluster stores a member list that identifies all the members of the cluster and the capabilities of each member. In this example, the CLB module 125 of node 105a updates its stored member list to add the joining node 105 as a member of the cluster. In embodiments, updating the member list includes modifying the member list to include the IP address of the joining host and capabilities of the joining host, received from node 105n at step 505.

Still referring to step 515, after updating its member list, the member host transmits its updated member list to the joining host. In this example, the CLB module 125 of node 105a transmits the member list to node 105n.

At step 520, the joining host transmits the credential, its IP address, and its capabilities to each member in the member list received at step 515. In embodiments, when a host joins a cluster, it advertises its participation in the cluster by securely transmitting to other members using the credential and information obtained from the first host responding the joining action. In this example, the CLB module 125 of node 105n transmits the credential, the IP address of node 105n, and the capabilities of node 105n to each of nodes 105b and 105c.

At step 525, each member that receives the transmission at step 520 validates the credential and updates its own respective member list based on the information received from the joining host. In embodiments, the other member recipients validate the credential against a saved list or by querying other members of the cluster using the credential for authenticating each interaction. In this example, the CLB module 125 of node 105b receives the credential, the IP address, and the capabilities from node 105n. After validating the credential, node 105b updates its locally stored member list to add the IP address and capabilities of node 105n. Node 105c performs a similar operation with its locally stored member list. At this point, the joining host (e.g., node 105n in this example) is a recognized member of the cluster and is considered in load balancing determinations made by members of the cluster, as described herein.

In embodiments, any member of a cluster may leave the cluster by performing a "leave" action in which the leaving member notifies at least one other member of the cluster. In embodiments, a join action and a leave action performed toward any member in a cluster triggers an "advertise" action, which causes the contacted cluster member to contact every host in the member list with a list of current members of the cluster and the change status (join or leave) of each member. In one example, when a member (e.g., node 105c) receives a member list from another member (e.g., node 105a) that does not match its stored member list, that member (e.g., node 105c) transmits the difference to other members (e.g., nodes 105a, 105b, 105n) so that each member may perform a reconciliation to determine the current members in the cluster and to update their respective member lists.

Figure 6:
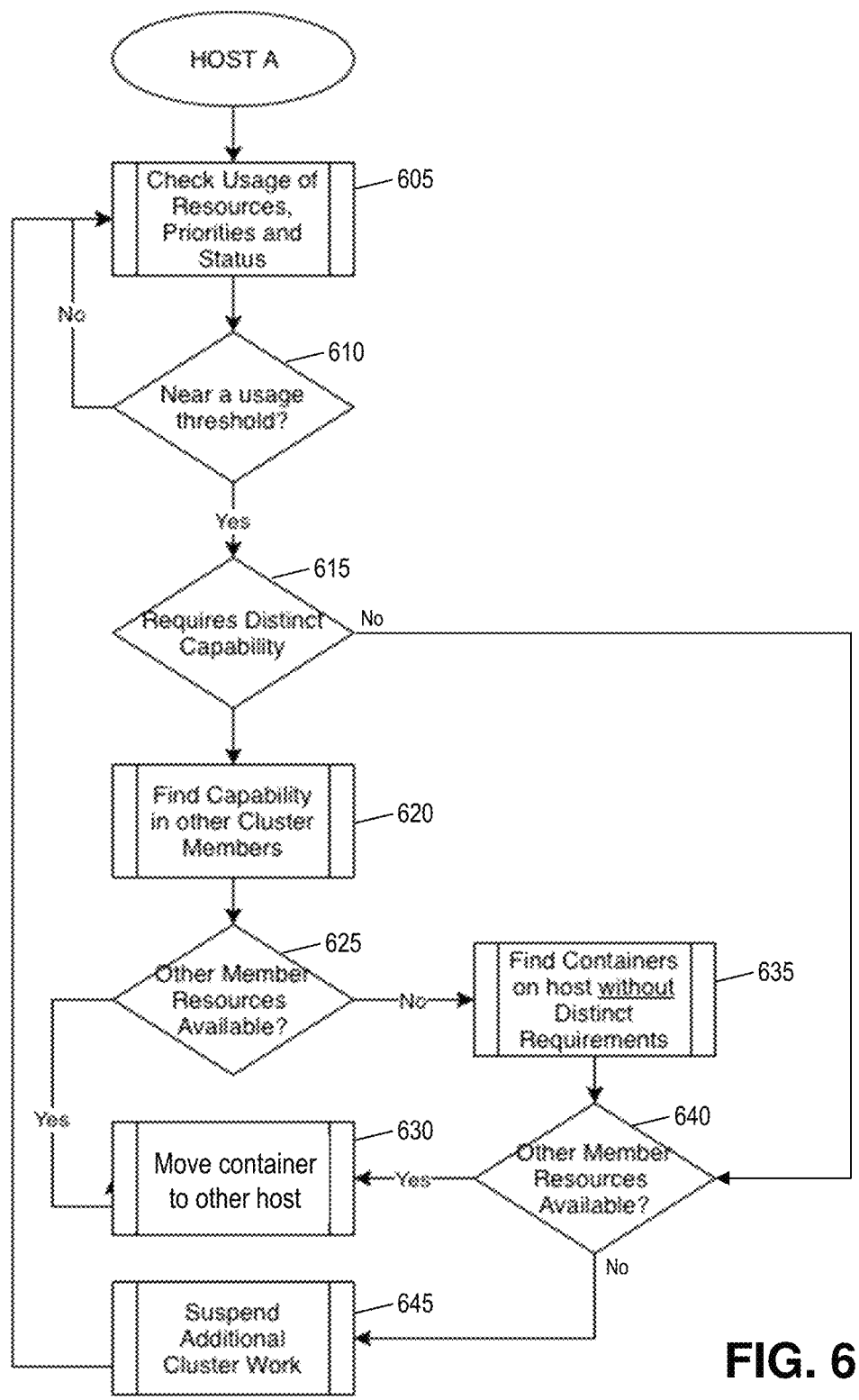
FIG. 6 shows a flowchart of an exemplary method in accordance with aspects of the invention.

FIG. 6 shows a flowchart of an exemplary method of container load balancing in a cluster in accordance with aspects of the present invention. In embodiments, the method of prioritization illustrated in FIG. 6 is how a given cluster member (e.g., host A in this example) determines how to prioritize container retention or movement. In embodiments, this is governed by consumption of distinct host services that are defined by the owner/administrator of each respective host. In embodiments, the workloads (e.g., containers) that do not require the distinct services of the host can be relocated to another suitable host (e.g., host B in this example) using the protocol described herein. Steps of the method may be carried out in the environment of FIG. 4 and are described with reference to elements depicted in FIG. 4.

At step 605, a host (e.g., "host A") in a container cluster (e.g., cluster 100) checks the usage of its resources, priorities, and status. In this example, host A is one of the nodes (e.g. node 105a) in the cluster 100 of FIG. 4. In embodiments, host A monitors its own resources (e.g., CPU usage, memory usage, disk usage, etc., of the node) to determine if the usage of any of the resources is nearing a pre-defined threshold in availability of one or more distinct services. In embodiments, the CLB module 125 of host A performs the monitoring at step 605.

At step 610, host A determines whether it is near a usage threshold. In embodiments, each host may define a threshold value for each category of host resource, such as CPU usage, memory usage, and disk usage. In one example, the threshold value is expressed as a term of percent usage or percent availability. For example, one host might define a CPU threshold as 80% of CPU capacity. In embodiments, a host is near a usage threshold if, given the current usage of the resource (determined at step 605), running a particular container would cause the usage of this resource to exceed the threshold. For example, consider the host having a CPU threshold as 80% of CPU capacity. In this example, the host determines at step 605 that the current level of CPU usage is 65%, and that the host is scheduled to run a particular container while at this current level of CPU usage. At step 610, the host determines whether running this particular container would cause the CPU usage to exceed the threshold of 80%. For example, if running this particular container requires 10% CPU usage of this host, then this host is not near the usage threshold (e.g., because 65% plus 10% is less than the threshold value of 80%). On the other hand, if running this particular container requires 20% CPU usage of this host, then this host is near the usage threshold (e.g., because 65% plus 20% is greater than the threshold value of 80%). Embodiments are not limited to this exemplary technique for determining being near a threshold, and hosts may use other methods in implementations of the invention. Along these same lines, one host in a cluster may use a different threshold value and/or a different threshold calculation technique compared to another host in the same cluster. Even further, a single host may use different threshold values and/or different threshold calculation techniques for different resources within the single host.

In accordance with aspects of the invention, the CLB module 125 of host A performs steps 605 and 610 while running the particular container or prior to a scheduled time for running the particular container. In the event that host A determines at step 610 that it is not near the usage threshold, then host A deems itself as not being resource-constrained, and runs the container while continuing to monitor the usage periodically by returning to step 605. On the other hand, in the event that host A determines at step 610 that it is near the usage threshold, then host A deems itself as being resource-constrained for running this particular container, and the process proceeds to step 615. In this manner, the host determines that it is resource-constrained from running the container.

At step 615, the host determines whether this particular container requires a distinct capability. In embodiments, step 615 comprises the CLB module 125 of host A determining whether the container in question has any tags as described herein. At this stage of the process, host A has a copy of the container in question, and the CLB module 125 of host A analyzes this copy to determine the presence of any tags of the type described herein. If the container does not include any tags, then the container does not require any distinct capability (e.g., can be run by any host in the cluster that is not resource-constrained), and the process proceeds to step 640 described below. If the container includes at least one tag, then the container requires a distinct capability (e.g., can only be run by a host in the cluster having that same capability as the tag), and the process proceeds to step 620.

At step 620, the host finds the required distinct capability requirement (from step 620) in one or more other members (e.g., hosts) in the cluster. In embodiments, step 620 comprises the CLB module 125 of host A comparing the one or more tags of the container in question to the capabilities of each host in the cluster. In embodiments, as described herein, each member (e.g., host) of the cluster 100 stores a member list that identifies all other members of the cluster and the capabilities of each member of the cluster. Using the tags of the container and the capabilities of each host defined in the member list, the CLB module 125 of host A identifies another host having capabilities that match the tags of this container. In this manner, the host identifies another host in the container cluster with capabilities matching the container.

At step 625, the host determines whether the resources of the other host (identified at step 620) are available to run this container. In embodiments, the CLB module 125 of host A transmits a request to the other host (e.g., host B in this example) to run the container. The other host (e.g., host B) determines whether it has resources available to run this container, e.g., as described in the method of FIG. 7. In the event it is determined at step 625 that host B can run the container, then host B transmits an acceptance message to host A, and at step 630 host A moves the container to host B. At this point, host B runs the container and host A does not run the container (or stops running the container if it was already running on host A). In some embodiments, host A may delete its copy of the container after moving the container to host B.

In the event it is determined at step 625 that host B cannot run the container, then host B transmits a rejection message to host A. In response to the rejection, at step 635 host A attempts to identify at least one other container currently running on host A, other than the container in question, that can be moved to another host. In embodiments, by moving another container (e.g., a second container that does not require distinct capabilities), host A frees up resources of host A that can be used to run the container in question (e.g. the first container that requires distinct capabilities) without causing host A to exceed the usage threshold. For example, host A attempts to identify a second container that is running on host A, this second container having no tags that indicate a requirement for a distinct host capability.

At step 640, host A determines whether any other hosts in the cluster can handle the second container that has no tags. In embodiments, step 640 comprises host A transmitting a request to run the second container to all hosts of the cluster (other than itself). In response, each host that receives the request determines whether it has the resources available to run the second container. Any host that can run the second container returns an acceptance message to host A. In the event it is determined at step 640 that another can run the second container, then the other host transmits an acceptance message to host A, and at step 630 host A moves the second container to the other host. At this point, the other host runs the second container and host A does not run the second container (or stops running the second container if it was already running on host A). In some embodiments, host A may delete its copy of the second container after moving the container to the other host. At this point, host A may also determine anew whether it now has sufficient resources to run the container in question (e.g. the first container that requires distinct capabilities). In the event it is determined at step 640 that no other host can run the second container, then at step 645 host A suspends running the container in question, and returns to step 605.

Figure 7:
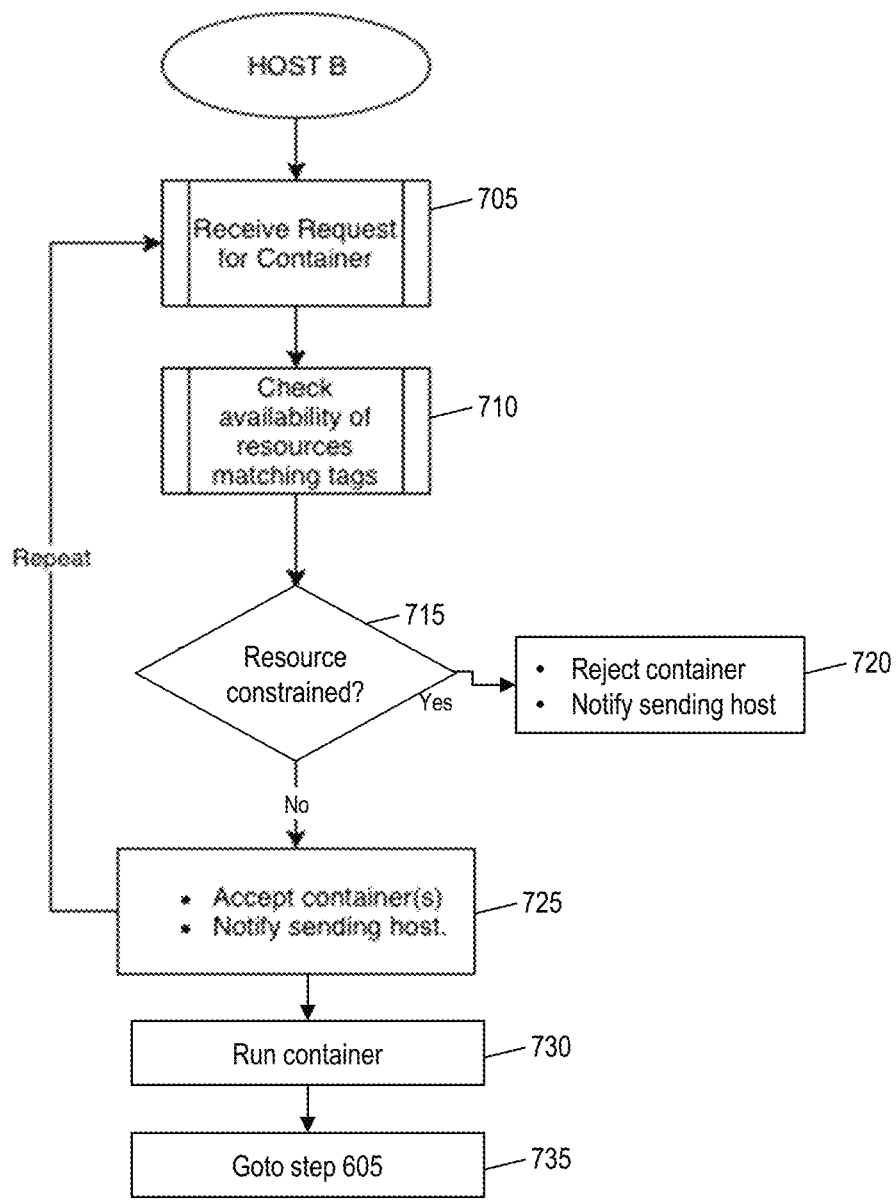
FIG. 7 shows a flowchart of an exemplary method in accordance with aspects of the invention.

FIG. 7 shows a flowchart of an exemplary method of container load balancing in a cluster in accordance with aspects of the present invention. In embodiments, the steps of the method are carried out by second host in the container cluster in response to a first host performing step 625 or step 640 of FIG. 6. Steps of the method may be carried out in the environment of FIG. 4 and are described with reference to elements depicted in FIG. 4.

At step 705, the second host (e.g., host B in this example) receives a request from the first host (e.g., host A) to run a container that the first host is resource-constrained from running itself. At step 710, the second host determines the availability of its own resources that correspond to the tags of the container. At step 715, the second host determines whether it is resource-constrained from running the container, e.g., by comparing the availability of the resources determined at step 710 to the amount of resources required to run this container on this host. If running this container on this host would cause this host to exceed a usage threshold (e.g., similar to step 610), then the second host determines itself to be resource-constrained, and at step 720 the second host rejects the container by sending a rejection message to the first host.

On the other hand, if running this container on the second host would not cause the second host to exceed a usage threshold, then the second host determines itself to be available to run this container (e.g., not resource-constrained), and at step 725 the second host accepts the container by sending an acceptance message to the first host. At step 730, the second host runs a copy of the container. At step 735, the second host begins the process at step 605 of FIG. 6.

Figure 8:
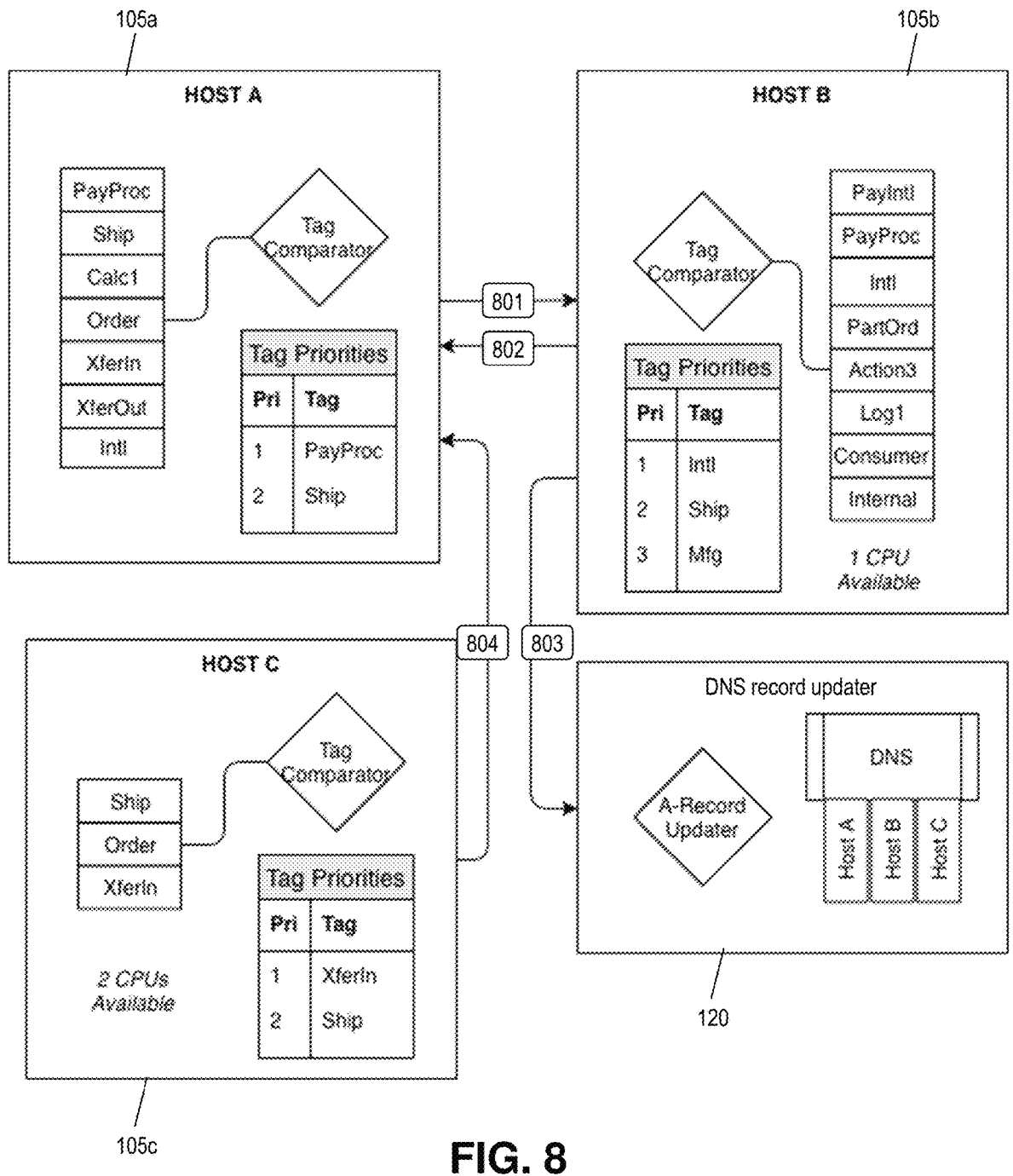
FIG. 8 shows a block diagram of exemplary use case in accordance with aspects of the invention.

FIG. 8 shows a block diagram of exemplary use case in accordance with aspects of the invention. The use case may be carried out in the environment of FIG. 4 and is described with reference to elements depicted in FIG. 4.

As shown in FIG. 8, a cluster (e.g., cluster 100) comprises host A (node 105*a*), host B (node 105*b*), host C (node 105*c*), and DNS record updater 120. Hosts A, B, and C are parts of a distributed cluster that are able to communicate with each other over a network. Each container on a host maintains a set of permitted and supported tag values with host priorities assigned to each. These host priorities are restrictions that the infrastructure owner has placed on the workloads it will support over others.

In this example, Host A hosts containers tagged with PayProc, Ship, Calc1, Order, Xferin, XferOut, and Intl tags. Host A has host priorities of PayProc first and Ship second, meaning that host A is constrained to allocate its resources in priority order first to any PayProc tagged containers, second to any Ship tagged containers, and any remaining resources to any other container. Host B hosts containers tagged with PayIntl, PayProc, Intl, PartOrd, Action3, Log1, Consumer, and Internal tags. Host B has host priorities of Intl first, Ship second, and Mfg third meaning that host B is constrained to allocate its resources in priority order first to any Intl tagged containers, second to any Ship tagged containers, third to any Mfg tagged containers, and any remaining resources to any other container. Host C hosts containers tagged with Ship, Order, and Xferin tags. Host C has host priorities of Xferinfirst and Ship second, meaning that host C is constrained to allocate its resources in priority order first to any Xferin tagged containers, second to any Ship tagged containers, and any remaining resources to any other container.

In this example, Host A prioritizes PayProc above all others and Ship second. Any spare processing resources are available for use by containers on other host cluster members. If Host A is resource bound (e.g., resource-constrained), then Host A moves the lower priority processes to another host. For example, since Order and Calc1 are not prioritized or have a lower priority than PayProc and Ship for Host A, at step 801 Host A advertises these containers to peer hosts (B &C) for relocation.

In this example, Host B prioritizes Intl, Ship, and Order above others. At step 802, Host B responds to Host A's advertisement to suspend and move the Order container to Host B using a one-time generated action identifier. Host A then establishes a connection to Host B with the same identifier and performs the move of the container. Host B then informs the DNS record updater 120 of an "A Record" update pointing to the other host/container, as indicated at step 803. Host A can decide when use of the old container has ceased and terminate the process.

In embodiments, the DNS record updater 120 propagates the new DNS record to all appropriate peer DNS servers for the cluster. In this example, Host A will wait a pre-configured amount of time before terminating support for the container to be moved. Host B will begin accepting requests immediately.

Still referring to the exemplary use case depicted in FIG. 8, in parallel the priorities of the container are used in the matching process. For example, at step 804 Host C responds to the advertisement of Host A that it can accept a workload XferOut even though it is not in Host C's priority list. This is because Host C has 2 CPUs available and XferOut on Host A has a tag indicating 2 CPUs are required (e.g., "CPU:*2"). In this example, Host B could not accept this XferOut container with the "CPU:*2" tag since Host B only has 1 CPU available.

In embodiments, in the case that more than one destination host has an acceptable solution to which a transfer can be made, the sending host will decide which host is preferred based on any criteria configured by the administrator. If no criteria are specified, the first response received will be the appointed recipient. In embodiments, if no candidate recipient responses are received in a configured time window and the sending host resources are exhausted, one or more of the lower priority workloads will be terminated.

Optionally, a sending host can specify a response time deadline in Coordinated Universal Time (UTC) format. This time can be optionally used by the receiving host candidates to determine if a response is feasible. If a response in infeasible, the receiving candidate can ignore the request and allow the sending host timer to expire.

This approach to load balancing resources for containers enables many members of a cluster to be added or removed and dynamically adapt to workloads and preferences, so long as the protocol and container tag priorities be defined. The tags can be confidential and encrypted so that only authorized hosts may participate. A host must have the pre-shared key and acceptable tag value pairs for prioritization.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for container load balancing in a container cluster comprising a plurality of hosts, comprising:
   storing, by a first host in the container cluster a respective member list that defines capabilities and priorities of each host of the container cluster, the capabilities of each of the hosts including a service available to each of the hosts and the priorities of each host includes a prioritization of the capabilities of each host that permits prioritized usage of owned assets list, and wherein each host in the container cluster stores the respective member list;
   determining, by the first host in the container cluster, the first host is resource-constrained from running a container based on determining that the first host is near a usage threshold of a resource of the first host;
   determining, by the first host, the container includes encrypted tags, wherein the encrypted tags contain name value pairs defining host requirements of the container;
   identifying, by the first host from the respective member list, a second host in the container cluster with the capabilities matching the encrypted tags of the container;
   determining, by the first host, the second host has available resources to run the container;
   transmitting, by the first host, a request to the second host to run the container based on the identifying of the second host and the determining the second host has available resources;
   receiving, by the first host, an acceptance from the second host; and
   moving, by the first host, the container to the second host, wherein the identifying the second host comprises comparing the encrypted tags of the container to capabilities of other hosts in the container cluster, and wherein the encrypted tags comprise name-value pairs that define host requirements of a given container.

2. The method of claim 1, further comprising stopping running the container on the first host when the container is moved to the second host.

3. The method of claim 1, further comprising:
   deleting the container from the first host when the container is moved to the second host.

4. The method of claim 1, wherein the determining the first host is resource-constrained from running the container comprises determining that one or more other containers running on the first host have priority over the container.

5. The method of claim 4, wherein the determining that one or more other containers running on the first host have priority over the container is based on host priorities defined for the first host.

6. The method of claim 1, wherein the first host and the second host each comprises an operating system and a container runtime configured to run containers.

7. The method of claim 6, further comprising:
   receiving, by the first host, a request from a new host to join the container cluster, wherein the request includes a credential, an IP address of the new host, and data defining capabilities of the new host;
   confirming, by the first host, validity of the credential;
   updating, by the first host, the respective member list stored at the first host; and
   transmitting, by the first host, the updated respective member list to the new host.

8. The method of claim 6, wherein the container cluster does not contain a centralized load balancing node.

9. The method of claim 1, wherein the first host and the second host each include software provided as a service in a cloud environment.

10. A computer program product for movement of containers among participants in a container cluster comprising a plurality of hosts without central orchestration, wherein each host of the plurality of hosts stores a respective member list, the computer program product comprising a computer readable storage medium having program instructions embodied therewith, the program instructions executable by a second host in the cluster of hosts to cause the second host to:
    receive a request from a first host of the plurality of hosts to run a container that the first host is resource-constrained from running, wherein the request to run the container is based on capabilities and priorities of the second host matching one or more encrypted tags of the container, wherein the encrypted tags contain name value pairs defining host requirements of the container;
    select the second host from a respective member list stored on the first host, the respective member list including hosts of the cluster and the capabilities and the priorities of each of the hosts of the cluster, the capabilities of each of the hosts including a distinct service defined by an administrator available to each of the hosts, and the priorities of each host includes a prioritization of the capabilities of each host that permits prioritized usage of owned assets;
    determine the second host is not resource-constrained from running the container based on determining that the second host is not near a usage threshold of a resource of the second host;
    determine the second host has available resources to run the container;
    transmit an acceptance to the first host based on the determining the second host has the available resources;
    copy the container onto the second host; and
    run the container on the second host,
    wherein the cluster of hosts is devoid of a centralized load balancing node.

11. The computer program product of claim 10, wherein the program instructions cause the second host to transmit an update to a record updater.

12. The computer program product of claim 10, wherein:
    the first host and the second host each comprise an operating system and a container runtime configured to run containers.

13. A system for container load balancing in a container cluster, comprising:
    the container cluster comprising plural hosts that communicate with one another via a network, wherein:
    each of the plural hosts comprises a computing node that includes an operating system and a container runtime configured to run containers;
    each of the plural hosts stores a respective member list that defines capabilities and priorities of the plural hosts in the container cluster,
    wherein the capabilities include a distinct service defined by an administrator available to each of the plural hosts, and the priorities of each host includes a prioritization of the capabilities of each host that permits prioritized usage of owned assets;
    each of the plural hosts is configured to determine the host is resource-constrained from running a container based on determining the host is near a usage threshold of a resource of the host;

each of the plural hosts is configured to identify another one of the plural hosts for running the container based on comparing encrypted tags of the container to the capabilities of the plural hosts defined in the respective member list, wherein the encrypted tags contain name value pairs defining host requirements of the container, and wherein the identifying the another one of the plural hosts is based on matching the capabilities of the plural hosts to the encrypted tags of the container and prioritizing to balance workloads in response to determining that the another one of the plural hosts has available resources to run the container; and in response to being identified as the another one of the plural hosts for running the container, moving the container between the one of the plural hosts that is resource-constrained to the another one of the plural hosts and deleting the container from the one of the plural hosts.

14. The system of claim 13, wherein each one of the plural hosts is configured to perform the identifying the another one of the plural hosts for running the container in response to determining the one of the plural hosts is resource-constrained from running the container, and wherein the capabilities of the plural hosts defined in the respective member list are selected from a group corresponding to a same set of host requirements from which the encrypted tags are selected.

15. The system of claim 13, wherein the determining the one of the plural hosts is resource-constrained from running the container comprises determining that one or more other containers running on the one of the plural hosts have priority over the container based on host priorities defined for the one of the plural hosts.

* * * * *